US007866728B2

(12) United States Patent
Suzuki

(10) Patent No.: US 7,866,728 B2
(45) Date of Patent: Jan. 11, 2011

(54) OPENING AND CLOSING MEMBER CONTROL APPARATUS FOR VEHICLE

(75) Inventor: Shintaro Suzuki, Kasugai (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 118 days.

(21) Appl. No.: 12/257,781

(22) Filed: Oct. 24, 2008

(65) Prior Publication Data

US 2009/0107050 A1 Apr. 30, 2009

(30) Foreign Application Priority Data

Oct. 30, 2007 (JP) ............................. 2007-282211

(51) Int. Cl.
*B60J 5/10* (2006.01)

(52) U.S. Cl. ................... 296/146.4; 296/56; 296/146.8; 49/324

(58) Field of Classification Search .............. 296/146.8, 296/146.4, 56; 49/324, 334, 340, 357
See application file for complete search history.

(56) References Cited

U.S. PATENT DOCUMENTS 7,547,058 B2 * 6/2009 King et al. ............... 296/146.8

FOREIGN PATENT DOCUMENTS

JP 9-125820 A 5/1997
JP 2001-246936 A 9/2001

* cited by examiner

*Primary Examiner*—Joseph D Pape
(74) *Attorney, Agent, or Firm*—Buchanan Ingersoll & Rooney PC

(57) ABSTRACT

An opening and closing member control apparatus for a vehicle includes a driving device adapted to drive an opening and closing member to open and close an opening portion formed at a vehicle body, a sensor provided at a connecting portion connecting the vehicle body with the opening and closing member, the sensor detecting an opening operation and a closing operation of the opening and closing member, and a drive controlling device controlling the driving device to drive the opening and closing member to open or close the opening portion by determining the opening operation or the closing operation of the opening and closing member based on a detection value of the sensor.

20 Claims, 8 Drawing Sheets

OPENING AND CLOSING MEMBER CONTROL APPARATUS FOR VEHICLE

CROSS REFERENCE TO RELATED APPLICATIONS

This application is based on and claims priority under 35 U.S.C. §119 to Japanese Patent Application No. 2007-282211, filed on Oct. 30, 2007, the entire content of which is incorporated herein by reference.

FIELD OF THE INVENTION

This invention generally relates to an opening and closing member control apparatus for a vehicle.

BACKGROUND

Various types of vehicle opening and closing member control apparatuses are proposed. For example, according to an opening and closing member control apparatus for a vehicle disclosed in JP9125820 (hereinafter referred to as "Reference 1"), in the cases where the opening and closing member such as a sliding door that can be automatically opened or closed is operated by a user, and the like, an operation of the door is detected, i.e., an opening or closing speed of the door is detected, by a speed sensor. Then, an electromagnetic clutch and a drive motor are powered on the basis of the detection results to thereby electrically assist the opening or closing operation of the door.

In addition, for example, an opening and closing member control apparatus for a vehicle disclosed in JP2001246936A (hereinafter referred to as "Reference 2") detects an operating force required for opening or closing the opening and closing member such as a door by means of an operating force sensor provided at a door handle. The door opening or closing operation is then assisted in response to the detected operating force.

According to the opening and closing member control apparatus disclosed in Reference 1, the door operation is detected by means of the speed sensor that detects the opening or closing speed of the door so as to supply power to the electromagnetic clutch and the drive motor. Thus, in the cases where the door is stopped between a fully closed position and a fully open position by means of the clutch in the connected state so as to prevent the door from moving by its own weight on a slope, and the like, the door cannot be operated by the user. As a result, the opening or closing speed of the door cannot be detected by the speed sensor. It may be difficult for the door to be electrically opened or closed from such stopped state.

According to the opening and closing member control apparatus disclosed in Reference 2, the operating force of the door handle is detected for assisting the door opening or closing operation in response to the detected operating force. At the time the door is operated via a portion other than the door handle, such operating force is not detectable. Thus, in the cases where the door handle is out of reach when the door is opened, such as a case of a rear hatch, the door handle cannot be operated when the door is stopped in the middle, i.e., stopped between the fully closed state and the fully open state. The opening or closing operation of the door cannot be assisted accordingly.

A need thus exists for an opening and closing member control apparatus for a vehicle which is not susceptible to the drawback mentioned above.

SUMMARY OF THE INVENTION

According to an aspect of the present invention, an opening and closing member control apparatus includes a driving device adapted to drive an opening and closing member to open and close an opening portion formed at a vehicle body, a sensor provided at a connecting portion connecting the vehicle body with the opening and closing member, the sensor detecting an opening operation and a closing operation of the opening and closing member, and a drive controlling device controlling the driving device to drive the opening and closing member to open or close the opening portion by determining the opening operation or the closing operation of the opening and closing member based on a detection value of the sensor.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
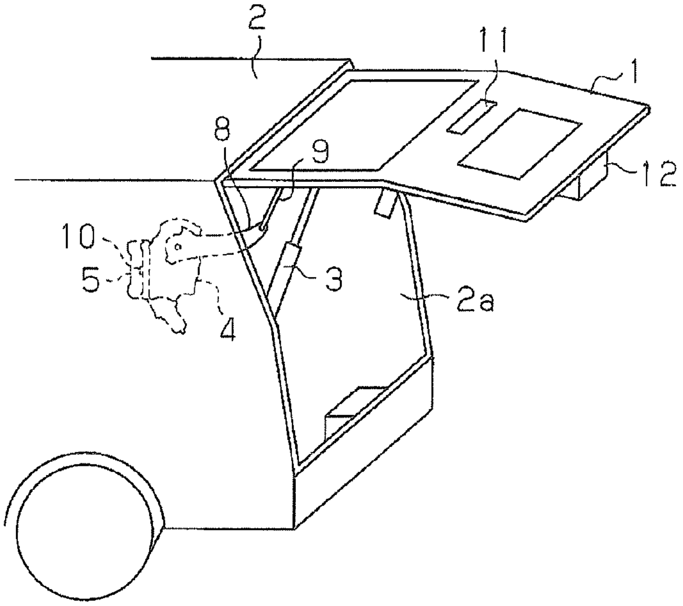
FIG. 1 is a perspective view schematically illustrating a rear hatch and a surrounding structure thereof where an opening and closing member control apparatus for a vehicle according to a first embodiment of the present invention is provided.

A first embodiment of an opening and closing member control apparatus for a vehicle will be explained with reference to the attached drawings. FIG. 1 is a perspective view schematically illustrating a rear hatch 1 serving as an example of an opening and closing member and a surrounding structure of the rear hatch 1 where the opening and closing member control apparatus for a vehicle according to the first embodiment is provided. As illustrated in FIG. 1, an opening portion 2*a* is formed at a rear portion of a vehicle body 2. The rear hatch 1 is attached to the vehicle body 2 so as to open or close the opening portion 2*a* by means of a door hinge provided at an upper rear portion of the vehicle body 2. That is, the rear hatch 1 is pivotally rotatable in an open direction or a close direction at the door hinge. The rear hatch 1 is supported by a gas spring 3, which assists the upward movement of the rear hatch 1 at the door hinge by means of a gas reaction.

Figure 2:
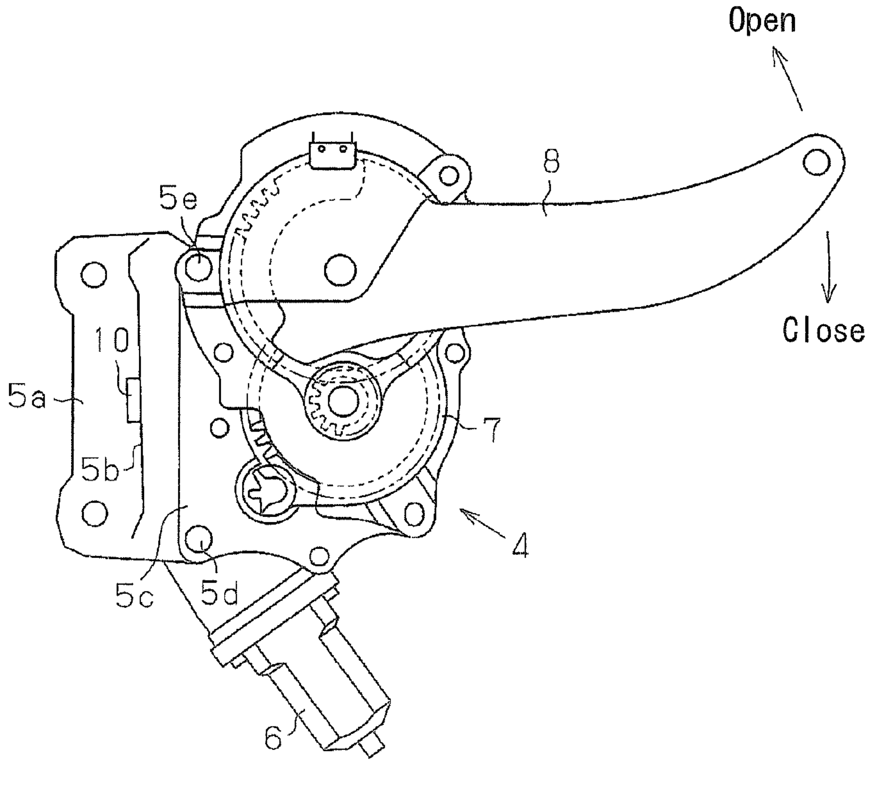
FIG. 2 is a side view of the opening and closing member control apparatus according to the first embodiment of the present invention.

A drive unit 4 serving as driving means is provided at a rear portion of the vehicle body 2 (specifically, an inner panel thereof) via a bracket 5 serving as a connecting portion and made of a metallic plate, for example. As illustrated in FIG. 2, the drive unit 4 includes an electric motor 6 of which rotational shaft is connected via a deceleration mechanism 7 to an arm member 8 having an elongated shape so that the arm member 8 can be driven by the electric motor 6. An end portion of the arm member 8 is rotatably connected to a first end of a bar-shaped rod 9, of which a second end is rotatably connected to the rear hatch 1. Accordingly, when the electric motor 6 is driven, i.e., the rotational shaft thereof rotates, revolutions of the electric motor 6 are decelerated by the deceleration mechanism 7 and transmitted to the arm member 8. In association with the rotation of the arm member 8, the rod 9 is pressed up or pulled down to thereby move the rear hatch 1 in the open direction or the close direction. The rear hatch 1 moves from a fully open position where the rear hatch 1 is fully opened to the vicinity of a fully closed position where the rear hatch 1 is fully closed.

The second end of the rod 9 is connected to the rear hatch 1 at a portion close to a rotational center of the rear hatch 1 (i.e., close to the door hinge) as illustrated in FIG. 1. Accordingly, when the rear hatch 1 is opened or closed, a significantly large load such as a force ten times larger than an operating force for opening or closing the rear hatch 1 is applied to the drive unit 4, the bracket 5, and the like because of the principle of leverage.

As illustrated in FIG. 2, the bracket 5 includes a plate-shaped fitting surface 5*a*, a stepped portion 5*b*, and a plate-shaped fitting surface 5*c*. The fitting surface 5*a* is mounted to the vehicle body 2. The stepped portion 5*b* is integrally connected to a portion of the fitting surface 5*a* close to the drive unit 4 and is arranged in parallel with a rotational axis of the arm member 8. The fitting surface 5*c* is bent from an end of the stepped portion 5*b* towards the drive unit 4 and is mounted to the drive unit 4. The fitting surface 5*c* is connected to the drive unit 4 at a fastening portion 5*d* arranged in the vicinity of the electric motor 6 and a fastening portion 5*e* arranged in the vicinity of a base portion of the arm member 8 by means of appropriate fasteners such as bolts and nuts. A straight line connecting the fastening portions 5*d* and 5*e* extends substantially in parallel with the stepped portion 5*b*. Substantially the entire drive unit 4 is arranged on an opposite side of the fitting surface 5*a* relative to the straight line.

In the cases where the rear hatch 1 of the aforementioned structure is opened or closed by a user, and the like from the outside of the vehicle, a strain having a polarity depending on the operating direction of the rear hatch 1 is generated in the stepped portion 5*b*. According to the present embodiment, a strain gauge 10 serving as a sensor is attached to the stepped portion 5*b* so as to detect a strain generated in the stepped portion 5*b*. The strain gauge 10 is arranged in the vicinity of substantially a center portion between the fastening portions 5*d* and 5*e* so that the strain gauge 10 can uniformly detect the strains generated in both opening and closing operations of the rear hatch 1.

Figure 3:
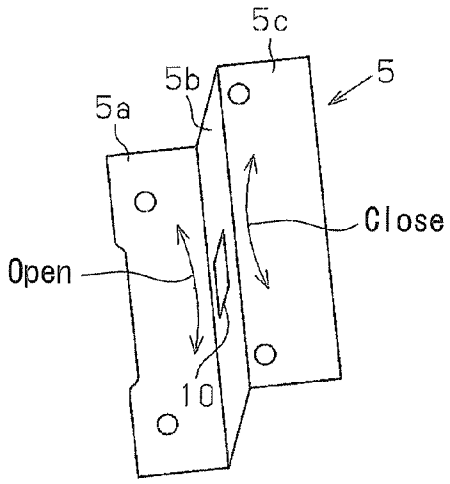
FIG. 3 is a diagram illustrating a bracket according to the first embodiment of the present invention.

Specifically, as illustrated in FIG. 3, when the rear hatch 1 is opened from the outside of the vehicle, i.e., the rear hatch 1 is operated in a direction to be pressed upward, a strain dominant in compressing the strain gauge 10 is generated in the stepped portion 5*b*. The strain generated in the stepped portion 5*b* is then converted into an electrical signal at the strain gauge 10. On the other hand, when the rear hatch 1 is closed from the outside of the vehicle, i.e., the rear hatch 1 is operated in a direction to be pressed downward, a strain dominant in elongating the strain gauge 10 is generated in the stepped portion 5*b*. The strain generated in the stepped portion 5*b* is then converted into an electrical signal at the strain gauge 10. Accordingly, each of the opening operation and the closing operation of the rear hatch 1 from the outside of the vehicle is detected as a strain at the strain gauge 10.

The rear hatch 1 is equipped with a door handle 11 by means of which the rear hatch 1 is opened from the outside of the vehicle in the cases where the rear hatch 1 is in the fully closed position or in the vicinity thereof. A known closer apparatus 12 is provided at a lower end portion of the rear hatch 1 for the purposes of driving the rear hatch 1 to move to the fully closed position so as to fully engage a striker provided at the vehicle body 2 when the rear hatch 1 is in a so-called half-shut state (i.e., half-latched state).

Figure 4:
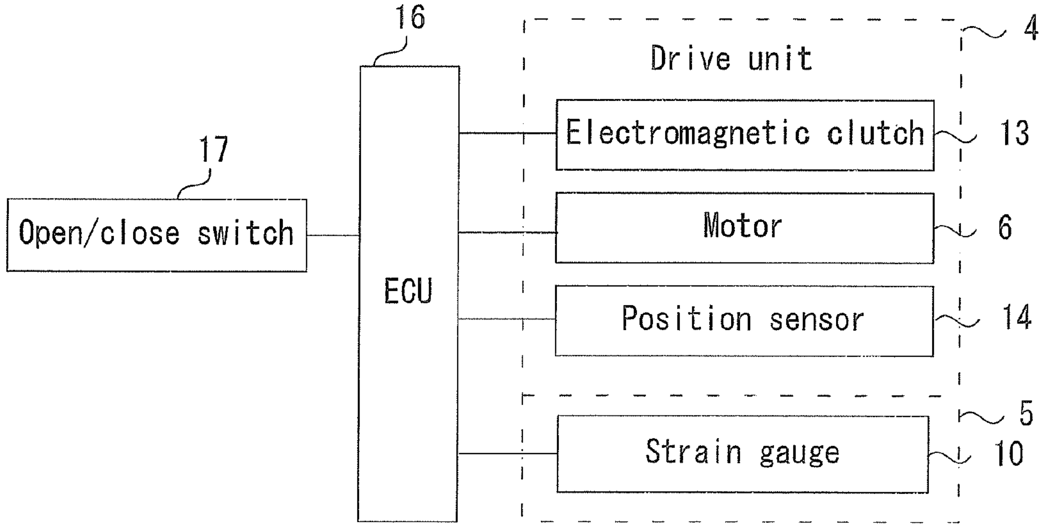
FIG. 4 is a block diagram illustrating an electrical structure of the opening and closing member control apparatus according to the first embodiment of the present invention.

An electrical structure of the opening and closing member control apparatus according to the first embodiment will be explained with reference to a block diagram illustrated in FIG. 4. As illustrated in FIG. 4, the drive unit 4 includes, in addition to the electric motor 6, an electromagnetic clutch 13 for connecting or disconnecting a power transmission between the electric motor 6 and an output shaft of the deceleration mechanism 7 (i.e., arm member 8), and a position sensor 14 for detecting a rotational angle of the electric motor 6, (i.e., an operating position of the rear hatch 1). The electric motor 6, the electromagnetic clutch 13, the position sensor 14 of the drive unit 4 and the strain gauge 10 attached to the bracket 5 are all electrically connected to an electronic control unit (i.e., ECU) 16 serving as driving control means to which an open/close switch 17 provided at a driver seat, for example, is also electrically connected. The ECU 16, which is mainly constituted by a digital computer, integrally includes functions of a ROM for storing various control programs related to an arithmetic processing performed by the digital computer, a RAM for temporarily storing various data such as a result of the arithmetic processing, a timer, and the like. The ECU 16 drives and controls the electric motor 6 and the electromagnetic clutch 13 so as to open or close the rear hatch 1 based on detection results of the strain gauge 10, the position sensor 14, and the open/close switch 17.

An opening and closing control of the rear hatch 1 performed by the ECU 16 will be explained below. The rear hatch 1 is assumed to be stopped at an arbitrary open position, i.e., between the fully open position and the fully closed position, and the electromagnetic clutch 13 is in the connected state to stabilize the arm member 8 relative to the drive unit 4 for the purposes of retaining the position of the rear hatch 1. In such circumstances, when the operating force for opening or closing the rear hatch 1 is applied from the outside of the vehicle by a user to an arbitrary portion of the rear hatch 1, the operating force is transmitted in order from the rear hatch 1 through the rod 9, the arm member 8, the drive unit 4, the bracket 5 and the vehicle body 2 (inner panel). At this time, the strain is generated in the strain gauge 10 attached to the stepped portion 5*b* of the bracket 5 and is then converted into the electrical signal at the strain gauge 10. The strain gauge 10 outputs the electrical signal to the ECU 16 as a detection value having a polarity depending on the operating direction of the rear hatch 1 by the user. The ECU 16 drives the electromagnetic clutch 13 to the connected state and maintains the connected state of the electromagnetic clutch 13 in response to the detection value. In addition, the ECU 16 controls the electric motor 6 to rotate in a direction depending on the operating direction of the rear hatch 1 by the user. Accordingly, the rear hatch 1 is opened or closed automatically in response to the operating direction of the rear hatch 1. In the cases where it is detected by the position sensor 14 that the rear hatch 1 reaches the fully open position or the vicinity of the fully closed position corresponding to the half-shut (half-latched) position, the ECU 16 drives the electromagnetic clutch 13 to the disconnected state and stops the driving of the electric motor 6. When the rear hatch 1 reaches the vicinity of the fully closed position corresponding to the half-shut (half-latched) position, the closer apparatus 12 is activated to drive the rear hatch 1 to the fully closed position.

According to the aforementioned first embodiment, the following effects may be obtained. (1) The strain gauge 10 is provided at the bracket 5 through which the drive unit 4 is attached to the vehicle body 2. Thus, even when the rear hatch 1 is stopped at any position between the fully closed position and the fully open position, for example, a force applied by a user to an arbitrary portion of the rear hatch 1 for opening or closing the rear hatch 1 is detectable at the bracket 5 (specifically, at the stepped portion 5*b* thereof). As a result, the opening operation or the closing operation of the rear hatch 1 is determined, i.e., it is determined which direction the rear hatch 1 is operated, on the basis of the detection value of the strain gauge 10 so as to open or close the rear hatch 1 by means of the drive unit 4, thereby starting the automatic open or close operation of the rear hatch 1 in response to the operating direction thereof.

(2) According to the aforementioned first embodiment, the opening operation or the closing operation of the rear hatch 1 is detectable by the strain gauge 10 having an extremely simple structure.

A second embodiment of the opening and closing member control apparatus for a vehicle will be explained with reference to the attached drawings.

Figure 5:
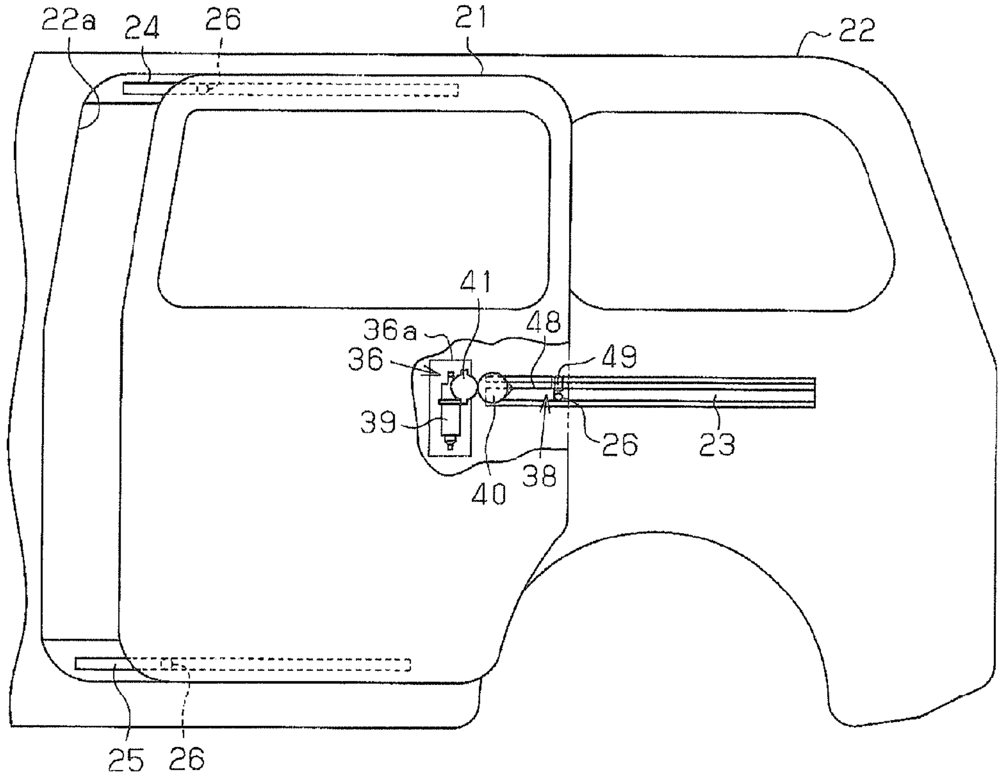
FIG. 5 is a side view schematically illustrating a sliding door and a surrounding structure thereof where an opening and closing member control apparatus for a vehicle according to a second embodiment of the present invention is provided.
Figure 6:
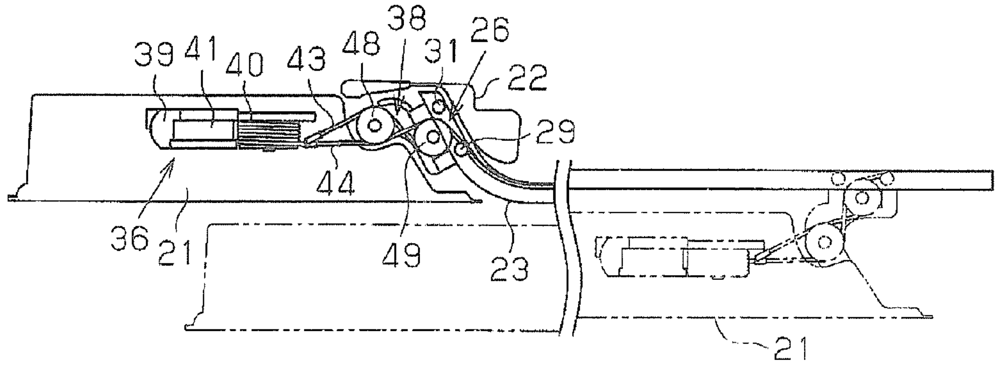
FIG. 6 is a plan view illustrating the sliding door and the surrounding structure thereof where the opening and closing member control apparatus according to the second embodiment of the present invention is provided.

FIGS. 5 and 6 are side view and a plan view, respectively, for schematically illustrating a sliding door 21 serving as an example of the opening and closing member and a surrounding structure of the sliding door 21 where the opening and closing member control apparatus for a vehicle according to the second embodiment is provided. As illustrated in FIGS. 5 and 6, the sliding door 21 opens or closes a rectangular-shaped opening portion 22*a* formed at a vehicle side body 22 serving as a vehicle body. The sliding door 21 is slidably supported by the side body 22 in a vehicle longitudinal direction. Specifically, the sliding door 21 slides along a center guide rail 23, an upper guide rail 24, and a lower guide rail 25.

The center guide rail 23 is fixed to an exterior surface of the side body 22 on a rear side relative to the opening portion 22*a* so as to extend in the vehicle longitudinal direction. The upper guide rail 24 is arranged along an upper end of the side body 22 in the vicinity of an upper end of the opening portion 22*a* and is fixed to the side body 22. The lower guide rail 25 is arranged along a lower end of the side body 22 in the vicinity of a lower end of the opening portion 22*a* and is fixed to the side body 22.

Guide roller units 26 slidably guided by the respective guide rails 23 to 25 are rotatably supported by the sliding door 21. With the respective guide roller units 26 sliding on the guide rails 23 to 25, the sliding door 21 is slidably operated, being guided by the guide rails 23 to 25 for opening or closing the opening portion 22*a*. The guide rails 23 to 25 are arranged in parallel with each other. Respective front ends of the guide rails 23 to 25 are bent towards a vehicle interior side for the purpose of guiding the sliding door 21 in such a way that the sliding door 21 and the exterior surface of the side body 22 are positioned on the same plane when the opening portion 22*a* is closed, i.e., the sliding door 21 is in the fully closed position. When the opening portion 22*a* is open, the sliding door 21 is positioned, overlapping the exterior surface of the side body 22 on the vehicle rear side relative to the opening portion 22*a* as illustrated in FIG. 6.

Figure 9:
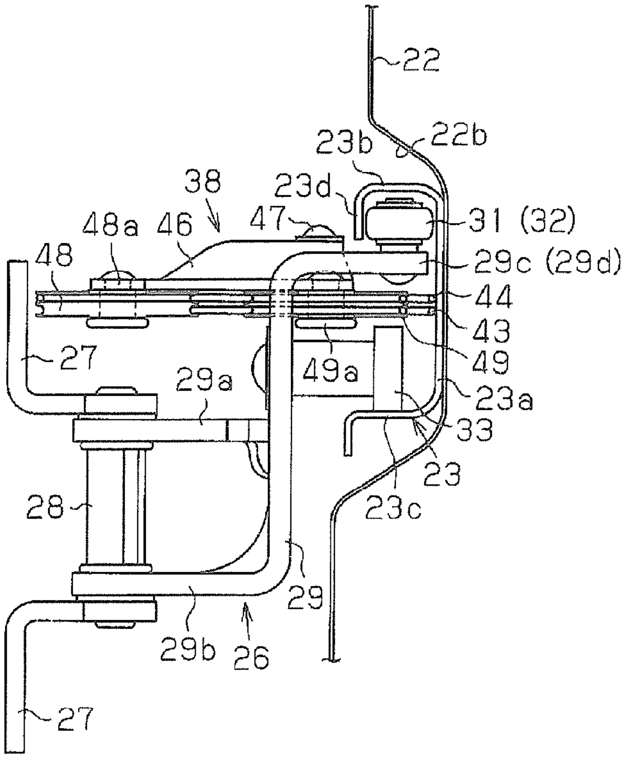
FIG. 9 is a longitudinal sectional view of FIG. 7.

As illustrated in FIG. 9, the center guide rail 23 is arranged inside of a recess 22*b* formed at the exterior surface of the side body 22. The center guide rail 23 includes a vertical wall 23*a*, a top wall 23*b*, a bottom wall 23*c*, and a flange wall 23*d* so as to form into a substantially U-shape when viewed in a cross section. The vertical wall 23*a* is joined to the exterior surface of the side body 22. The top wall 23*b* and the bottom wall 23*c* extend from an upper end and a lower end of the vertical wall 23*a*, respectively, to bend in parallel towards the vehicle exterior side. The flange wall 23*d* extends from an end portion on the vehicle exterior side of the top wall 23*b* to bend downwardly in parallel with the vertical wall 23*a*.

Figure 7:
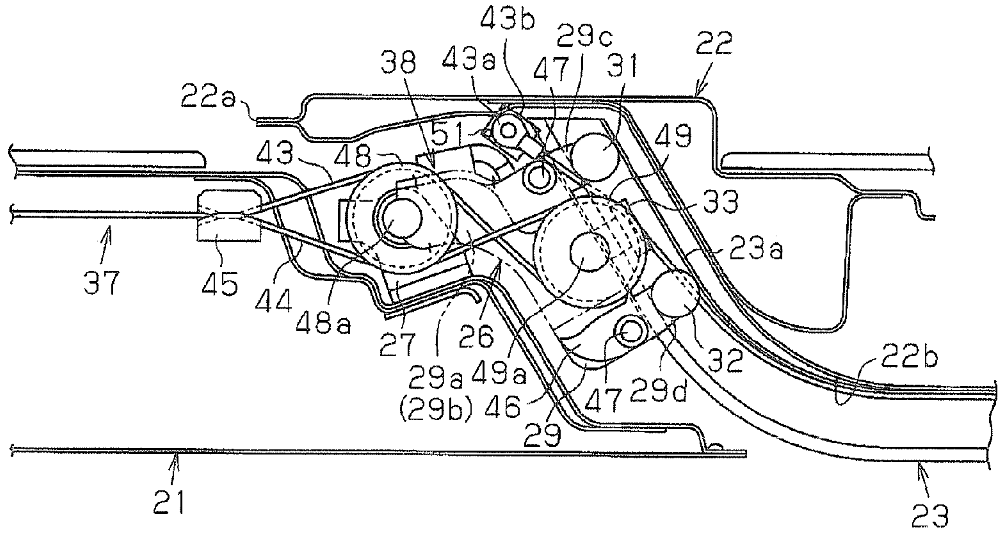
FIG. 7 is a plan view illustrating a closed state of the sliding door according to the second embodiment of the present invention.
Figure 8:
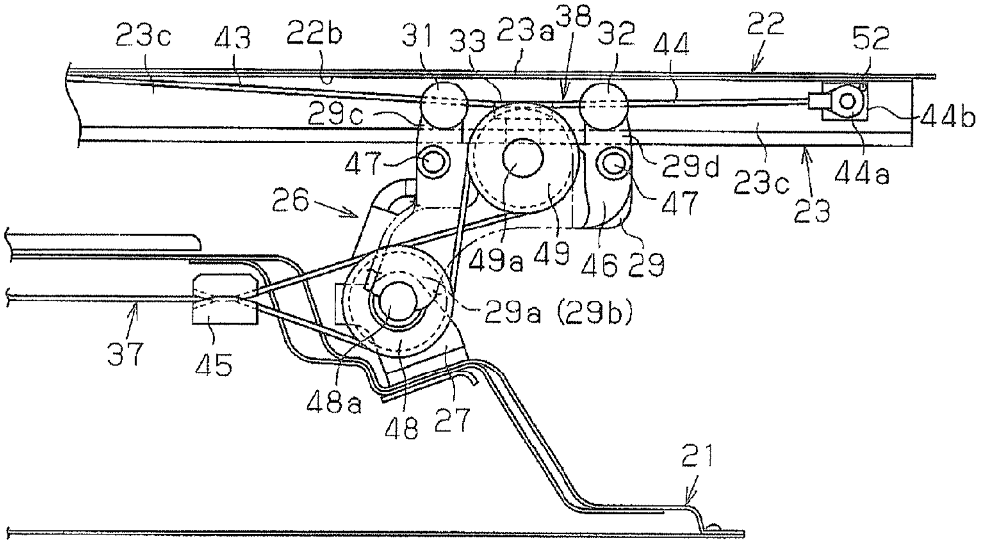
FIG. 8 is a plan view illustrating an open state of the sliding door according to the second embodiment of the present invention.

As illustrated in FIGS. 7 to 9, each of the guide roller units 26, i.e., the guide roller unit 26 for the center guide rail 23, for example, includes a base plate 29. The base plate 29 is supported via a pin 28 that extends in a vertical direction of the vehicle (i.e., vertical direction in FIG. 9) by brackets 27 fixed to the sliding door 21 in such a way that the base plate 29 is relatively rotatable to the brackets 27. The base plate 29 includes two leg portions 29*a* and 29*b* supported by the respective brackets 27, and two horizontal flanges 29*c* and 29*d* of which end portions are positioned in the cross-section of the center guide rail 23. The leg portions 29*a* and 29*b* are arranged in parallel with each other while keeping a predetermined distance therebetween in the vertical direction. End portions of the leg portions 29*a* and 29*b* are positioned between the two brackets 27. The pin 28 penetrates through the leg portions 29*a* and 29*b* in such a way to be relatively rotatable thereto. The pin 28 is fixed to the brackets 27 at both end portions. Accordingly, the base plate 29 is supported by the brackets 27 to be relatively rotatable thereto so that the guide roller unit 26 is rotatably supported by the sliding door 21. The horizontal flanges 29*c* and 29*d* are arranged on the same plane in the vehicle longitudinal direction while keeping a predetermined distance therebetween. End portions of the horizontal flanges 29*c* and 29*d* keep a predetermined distance therebetween and extend between the top wall 23*b* and the bottom wall 23*c* in parallel therewith. An inner roller 31 and an outer roller 32 are slidably supported by the end portions of the horizontal flanges 29*c* and 29*d*, respectively. The inner roller 31 and the outer roller 32 slide on the vertical wall 23*a* and the flange wall 23*d* of the center guide rail 23. In addition, a vertical roller 33 is rotatably supported by the base plate 29. The vertical roller 33 slides on the bottom wall 23*c* of the center guide rail 23. Accordingly, the guide roller unit 26 is slidably guided by the center guide rail 23 without a clearance in the vertical direction and the width direction of the vehicle. The other guide roller units 26 slidably guided by the upper guide rail 24 and the lower guide rail 25 have the same structure as that of the guide roller unit 26 slidably guided by the center guide rail 23. As a result, the sliding door 21 is slidably supported by the side body 22 via the guide roller units 26 guided by the guide rails 23 to 25 so as to be slidably operated.

Next, a power-sliding unit for driving the sliding door 21 to be slidably operated will be explained with reference to FIGS. 5 to 9. As illustrated in FIGS. 6 and 7, the power-sliding unit includes a drive unit 36 serving as driving means, a cable 37 serving as a drive force transmission member, and a pulley mechanism 38 serving as a connecting portion and a guiding device.

The drive unit 36 is arranged inside of the sliding door 21. Specifically, the drive unit 36 is fixed to a door panel of the sliding door 21 by means of a bracket 36*a* serving as a connecting portion (see FIG. 5). The drive unit 36 includes an electric motor 39 serving as a drive source and an output drum 40 being rotatable. The output drum 40 is connected to an output shaft of the electric motor 39 by means of a deceleration mechanism 41. The output drum 40 rotates in one direction when the electric motor 39 rotates in a forward direction and rotates in the other direction when the electric motor 39 rotates in a rearward direction.

The cable 37 includes two wires 43 and 44 of which respective one ends engage with the output drum 40. The wires 43 and 44 are wound around the output drum 40. As illustrated in FIG. 7, the other end 43*a* of the wire 43 is routed through the center guide rail 23, being guided by a wire guide 45 and the pulley mechanism 38 within the sliding door 21. The other end 43*a* of the wire 43 engages with a body panel of the side body 22 provided in the vicinity of a front end of the center guide rail 23 in the vehicle longitudinal direction by means of a front bracket 43*b* serving as a connecting portion and a retention device. In addition, as shown in FIG. 8, the other end 44*a* of the wire 44 is routed through the center guide rail 23, being guided by the wire guide 45 and the pulley mechanism 38 within the sliding door 21. The other end 44*a* of the wire 44 engages with the bottom wall 23*c* at a rear end of the center guide rail 23 in the vehicle longitudinal direction by means of a rear bracket 44*b* serving as a connecting portion and a retention device. The cable 37 may be constituted by only one cable wound around the output drum 40 and of which both ends engage with respective predetermined portions of the side body 2 of the vehicle. Further, the other ends 43*a* and 44*a* of the wires 43 and 44 may engage via the brackets 43*b* and 44*b* with any portions other than the portions described above at the front end and the rear end of a sliding operation range of the sliding door 21 in the vehicle longitudinal direction.

The pulley mechanism 38 is fixed by means of a base bracket 46 to the base plate 29 of the guide roller unit 26 via screws 47. Specifically, the pulley mechanism 38 includes two guide pulleys 48 and 49 that are rotatably supported by the base bracket 46 via pins 48*a* and 49*a*. As illustrated in FIGS. 7 and 8, the other ends 43*a* and 44*a* of the wires 43 and 44 are guided by the guide pulleys 48 and 49 in such a way to intersect with each other at both sides of each of the guide pulleys 48 and 49 and are routed through the center guide rail 23.

An operation of the power-sliding unit will be explained below. As illustrated by a solid line in FIG. 6, in the cases where the output drum 40 is driven to rotate in one direction by the electric motor 39 that rotates in the forward direction with the sliding door 21 in the closed state, the wire 44 of the cable 47 is reeled onto the output drum 40 while the wire 43 is reeled out from the output drum 40. Because the wires 43 and 44 are fixed to the vehicle body side at the other ends 43*a* and 44*a*, respectively, the guide pulley 49 moves towards the vehicle rear side (i.e., rightward direction in FIG. 6) along with the sliding of the guide roller unit 26 on the center guide rail 23. As a result, the sliding door 21 slides in the open direction (i.e., rightward direction in FIG. 6) as shown by a chain double-dashed line in FIG. 6.

On the other hand, in the cases where the output drum 40 is driven to rotate in the other direction by the electric motor 39 that rotates in the rearward direction with the sliding door 21 in the open state, the wire 43 of the cable 47 is reeled onto the output drum 40 while the wire 44 is reeled out from the output drum 40. Accordingly, the guide pulley 49 moves towards the vehicle front side (i.e., leftward direction in FIG. 6) along with the sliding of the guide roller unit 26 on the center guide rail 23. As a result, the sliding door 21 slides in the close direction (i.e., leftward direction in FIG. 6).

In the cases where the sliding door 21, which is not operated and stopped, is opened from the outside of the vehicle by a user and the like, the wire 43 is pulled in a state where the output drum 40 is locked, for example. A force resulting from the pulling of the wire 43 is transmitted to the drive unit 36 (output drum 40), the bracket 36*a* through which the output drum 40 is attached to the door panel of the sliding door 21, the front bracket 43*b* that holds the wire 43, the pulley mechanism 38 (guide pulleys 48 and 49) that guides the wire 43, the guide roller unit 26 (base plate 29), the bracket 27, and the like. As a result, a strain is generated in the front bracket 43*b*. On the other hand, in the cases where the sliding door 21, which is not operated and stopped, is closed from the outside of the vehicle by a user and the like, the wire 44 is pulled in a state where the output drum 40 is locked, for example. A force resulting from the pulling of the wire 44 is transmitted to the drive unit 36 (output drum 40), the bracket 36*a* through which the output drum 40 is attached to the door panel of the sliding door 21, the rear bracket 44*b* that holds the wire 44, the pulley mechanism 38 (guide pulleys 48 and 49) that guides the wire 44, the guide roller unit 26 (base plate 29), the bracket 27, and the like. As a result, a strain is generated in the rear bracket 44*b*. According to the second embodiment, the strains generated in the brackets 43*b* and 44*b* are detected by strain gauges 51 and 52 attached at the brackets 43*b* and 44*b*, respectively. The strain gauges 51 and 52 each serve as a sensor.

That is, when the sliding door 21 is opened from the outside, the strain generated in the front bracket 43*b* is converted into an electrical signal at the strain gauge 51. Likewise, when the sliding door 21 is closed from the outside, the strain generated in the rear bracket 44*b* is converted into an electrical signal at the strain gauge 52. The opening and closing operations of the sliding door 21 from the outside of the vehicle are detected by the strain gauges 51 and 52, respectively.

Figure 10:
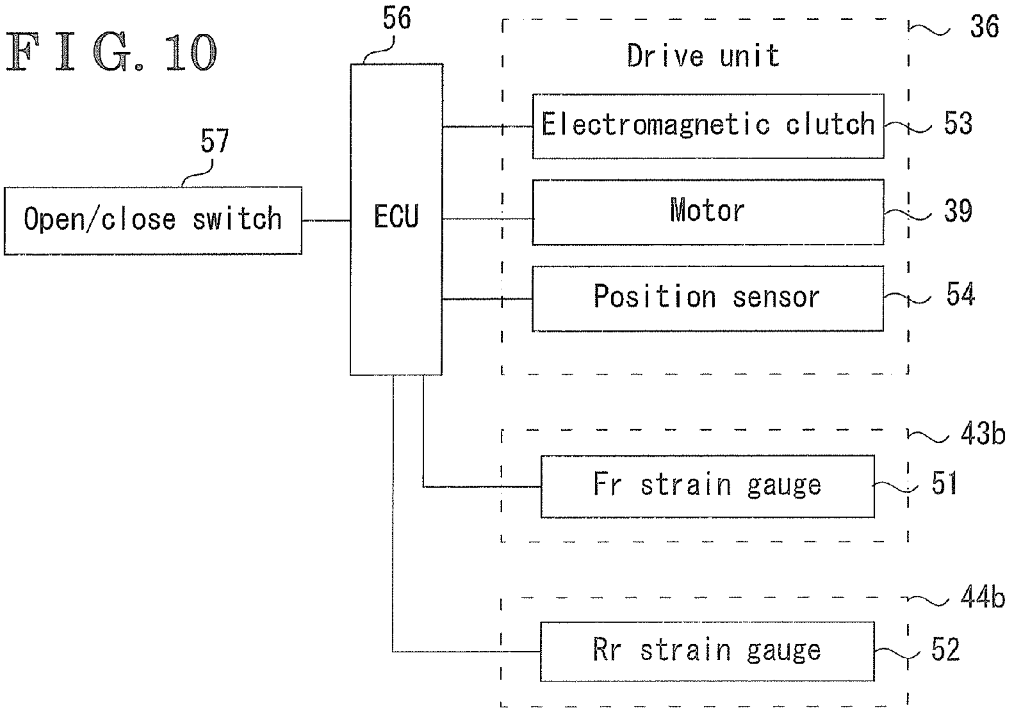
FIG. 10 is a block diagram illustrating an electrical structure of the opening and closing member control apparatus according to the second embodiment of the present invention.

An electrical structure of the opening and closing member control apparatus according to the second embodiment will be explained with reference to a block diagram illustrated in FIG. 10. As illustrated in FIG. 10, the drive unit 36 includes an electromagnetic clutch 53 and a position sensor 54 in addition to the electric motor 39. The electromagnetic clutch 53 connects and disconnects a power transmission between the electric motor 39 and the output drum 40. The position sensor 54 detects a rotational angle of the electric motor 39, i.e., an operating position of the sliding door 21. The electric motor 39, the electromagnetic clutch 53, the position sensor 54, and the strain gauges 51 and 52 attached to the brackets 43*b* and 44*b*, respectively, are electrically connected to an electronic controlled unit (ECU) 56 serving as driving control means to which an open/close switch 57 provided at a driver seat, for example, is also electrically connected. The ECU 56 drives and controls the electric motor 39 and the electromagnetic clutch 53 based on detection results of the strain gauges 51, 52, the position sensor 54, and the open/close switch 57, thereby controlling the sliding door 21 to open or close.

Figure 11:
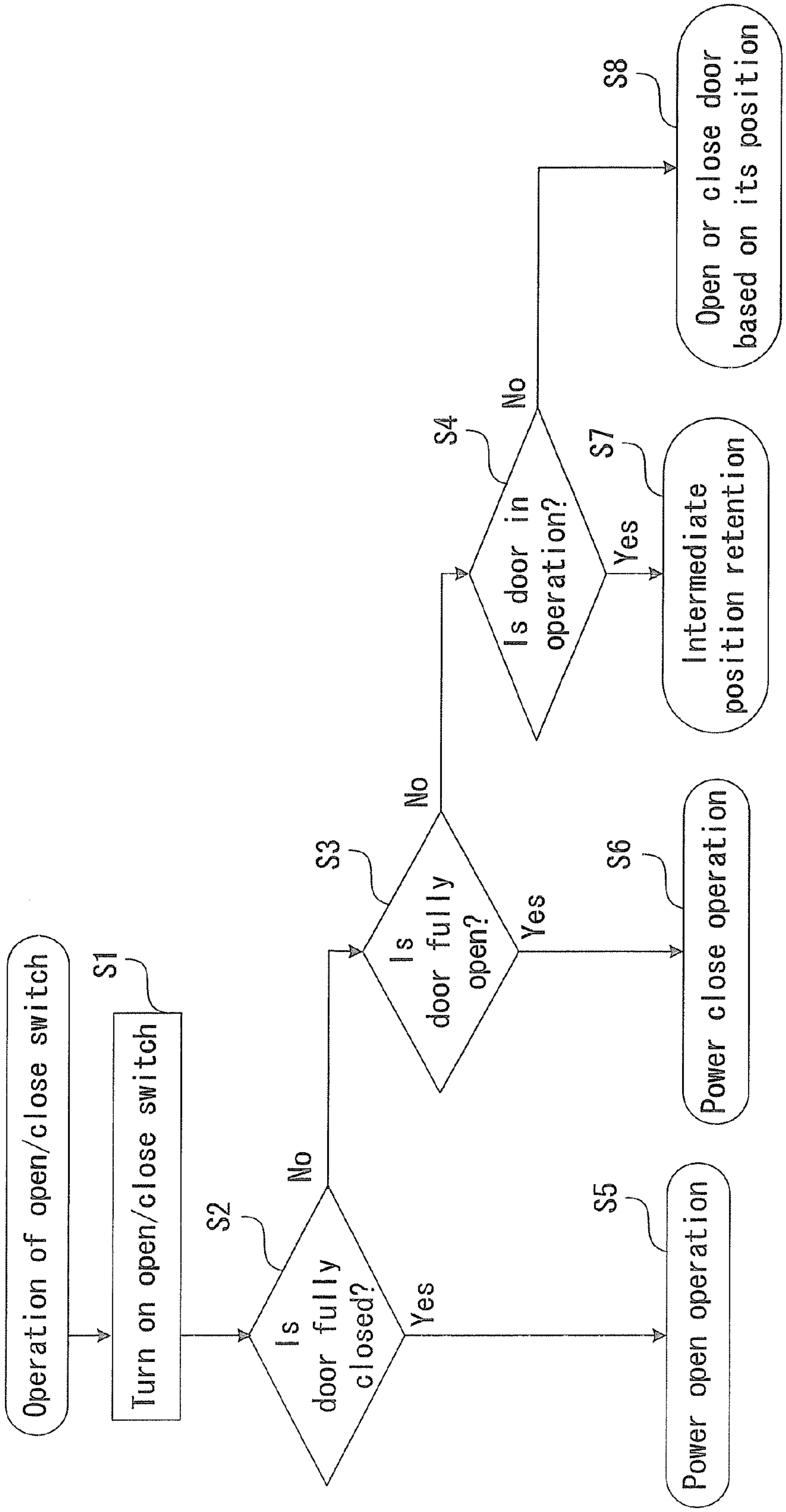
FIG. 11 is a flowchart illustrating a control of the sliding door according to the second embodiment of the present invention.

An opening and closing control of the sliding door 21 performed by the ECU 56 will be explained below. FIG. 11 is a flowchart illustrating the opening and closing control of the sliding door 21 when the open/close switch 57 is operated. As illustrated in FIG. 11, when the open/close switch 57 is operated by a user or the like in step (hereinafter simply referred to as "S") 1, it is determined whether or not the operating position of the sliding door 21 at that time is equal to the fully closed position in S2. When it is determined that the sliding door 21 is in the fully closed position, a known process for opening the sliding door 21 by the drive unit 36 (i.e., power open operation) is started in S5.

In the cases where the sliding door 21 is not in the fully closed position in S2, it is determined whether or not the operating position of the sliding door 21 when the open/close switch 57 is operated is equal to the fully open position in S3. When it is determined that the sliding door 21 is in the fully open position, a known process for closing the sliding door 21 by the drive unit 36 (i.e., power close operation) is started in S6.

Further, in the cases where the sliding door 21 is not in the fully open position in S3, i.e., the sliding door 21 is in a position between the fully closed position and the fully open position (i.e., intermediate position), it is determined whether or not the sliding door 21 when the open/close switch 57 is operated is in motion in S4. When it is determined that the sliding door 21 is in motion, a process for retaining the sliding door 21 in the intermediate position (i.e., intermediate position retention) is started in S7. On the other hand, when it is determined that the sliding door 21 is not in motion in S4, a known process for opening or closing the sliding door 21 in response to the position thereof at that time is started in S8.

In the cases where an overload equal to a force generated when an obstacle is pinched between the sliding door 21 and the vehicle body is detected in S5 and S6, which is not shown in FIG. 11, the operating direction of the sliding door 21 is reversed and the sliding door 21 moves by a predetermined distance in the reverse direction. Then, the sliding door 21 is shifted to the process in S7.

Figure 12:
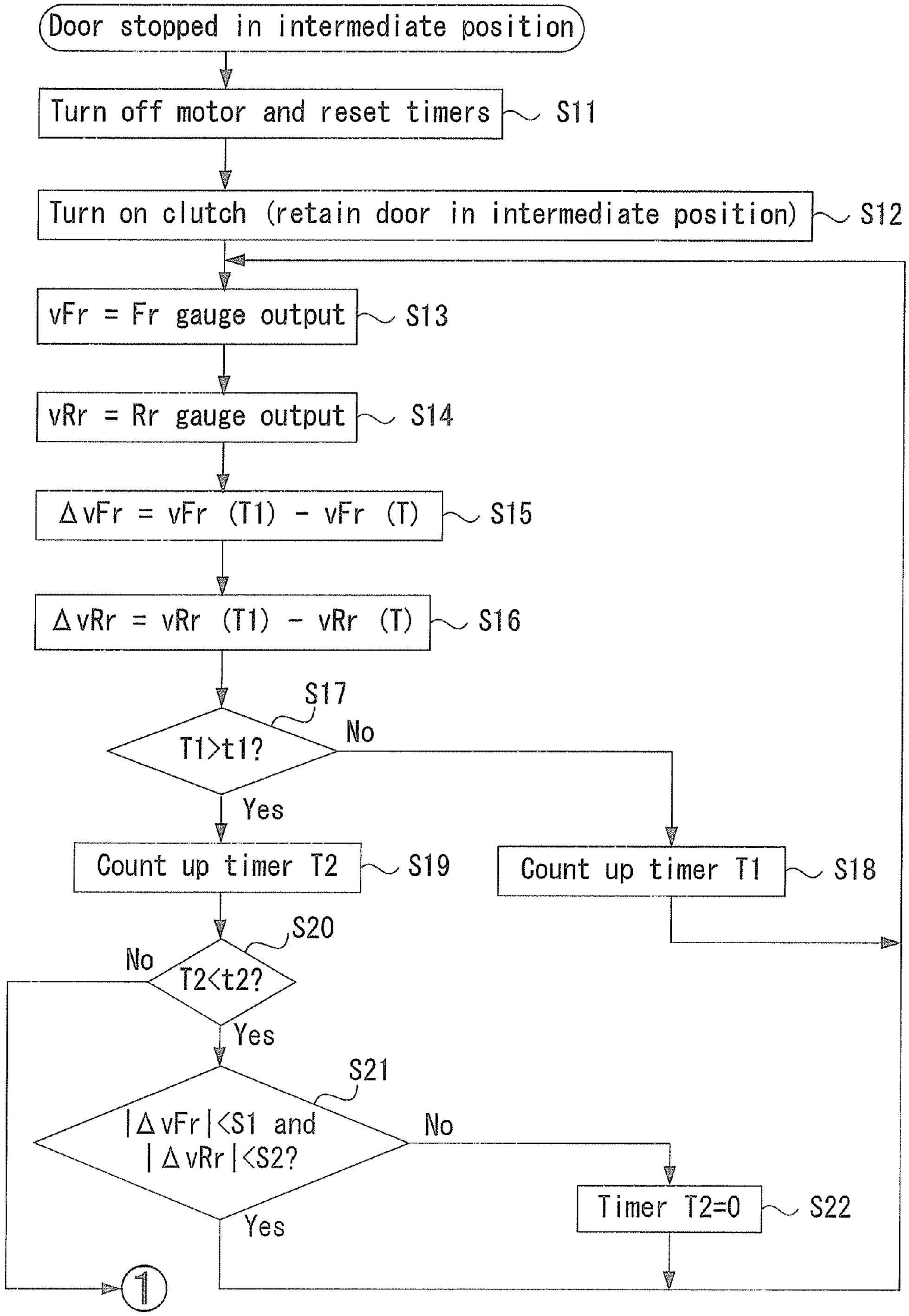
FIG. 12 is another flowchart illustrating a control of the sliding door according to the second embodiment of the present invention.
Figure 13:
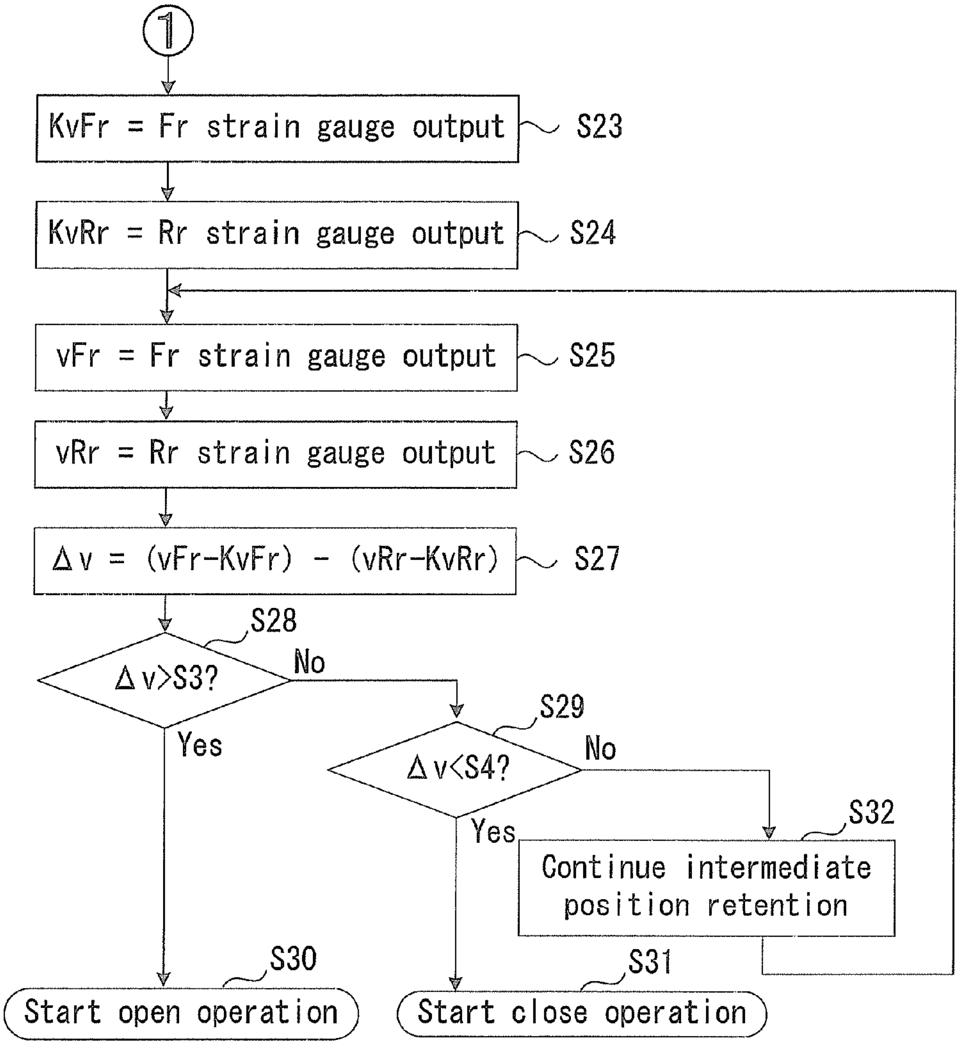
FIG. 13 is still another flowchart illustrating a control of the sliding door according to the second embodiment of the present invention.

Next, the intermediate position retention process will be explained below. FIGS. 12 and 13 are flowcharts each illustrating the opening and closing control of the sliding door 21 when the intermediate position retention process is started. The process illustrated in FIGS. 12 and 13 is started on the basis of the stop of the sliding door 21 in the intermediate position in association with the intermediate retention process.

As illustrated in FIG. 12, when the intermediate position retention process is started, the electric motor 39 is stopped and various timers are reset in S11. The electromagnetic clutch 53 is brought to the connected state so as to retain the sliding door 21 in the intermediate position in S12. Further, the electrical signal (i.e., detection value) of the strain gauge 51 provided at the front bracket 43*b* is obtained as a front detection value vFr in S13 while the electrical signal (i.e., detection value) of the strain gauge 52 provided at the rear bracket 44*b* is obtained as a rear detection value vRr in S14.

Next, a difference between a front detection value before time T1, i.e., vFr (T1), and a present front detection value vFr (T) is calculated as a front variation ΔvFr in S15. In the same way, a difference between a rear detection value before time T1, i.e., vRr (T1), and a present rear detection value vRr (T) is calculated as a rear variation ΔvRr in S16. The time T1 is duration from the stop of the electric motor 39 counted up by a timer.

It is determined whether or not the time T1 exceeds a predetermined time t1 in S17. When it is determined that the time T1 does not exceed the predetermined time t1, the time T1 is counted up by the timer in S18. The operation then returns to S13 to repeat the same routine. Accordingly, the time T1 is repeatedly counted up by the timer until the predetermined time t1 is fulfilled. Once the predetermined time t1 is reached, the predetermined time T1 (=t1) is maintained. That is, after the predetermined time t1 is fulfilled, the difference between the front detection value before time T1, i.e., vFr (T1), and the present front detection value vFr (T), and the difference between the rear detection value before time T1, i.e., vRr (T1), and the present rear detection value vRr (T) are calculated in S15 and S16, respectively.

Figure 14:
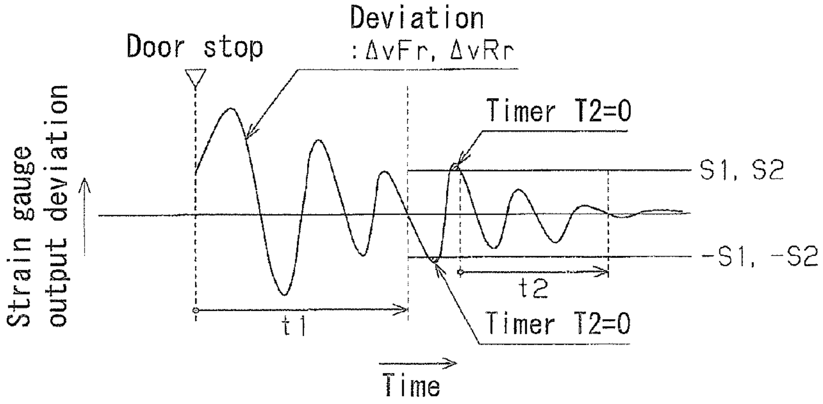
FIG. 14 is still another flowchart illustrating a control of the sliding door according to the second embodiment of the present invention.

The opening or closing operation of the sliding door 21 is not performed until the predetermined time T1 (=t1) has elapsed according to the processes in S13 to S18. This is to avoid a wrong operation of the sliding door 21 by a calculation of the ΔvFr and ΔvRr in an unstable state of the strain detection as shown in FIG. 14 that illustrates changes of the variations ΔvFr and ΔvRr over time from the stop of the sliding door 21 (i.e., stop of the electric motor 39). The variations ΔvFr and ΔvRr are unstable because the sliding door 21 is not stabilized due to an effect of the inertia generated immediately after the opening operation or the closing operation of the sliding door 21.

In the cases where the time T1 exceeds the predetermined time t1 in S17, a time T2 is counted up by a timer in S19 different from that measuring the time T1. It is determined whether or not the time T2 is below a predetermined time t2 in S20. When it is determined that the time T2 is below the predetermined time t2, then it is determined whether or not an absolute value (i.e., magnitude) of the front variation ΔvFr is below a predetermined value (i.e., threshold value) S1 and whether or not an absolute value (i.e., magnitude) of the rear variation ΔvRr is below a predetermined value (i.e., threshold value) S2 in S21.

When it is determined that the absolute value of the front variation ΔvFr is below the predetermined value S1 and the absolute value of the rear variation ΔvRr is below the predetermined value S2, the operation returns to S13 to repeat the same routine. On the other hand, when it is determined that the absolute value of the front variation ΔvFr is not below the predetermined value S1 or the absolute value of the rear variation ΔvRr is not below the predetermined value S2, the time T2 counted up by the timer is reset once in S22. The operation returns to S13 to repeat the same routine.

According to the present embodiment, it is confirmed in S13 to 17 and S19 to S22 that the state where the absolute value of the front variation ΔvFr is below the predetermined value S1 and the absolute value of the rear variation ΔvRr is below the predetermined value S2 is continued for the predetermined time t2. This is to verify that the variations ΔvFr and ΔvRr fall within a predetermined range and thus are stable, i.e., the load of the sliding door 21 is stable.

When the time T2 is not below the predetermined time t2 in S20, i.e., the time T2 is equal to or greater than the predetermined time t2, the stabilization of the load of the sliding door 21 is verified. Thus, as illustrated in FIG. 13, the present front detection value vFr is specified as a front reference value KvFr in S23 and the present rear detection value vRr is specified as a rear reference value KvRr in S24. Next, the front detection value vFr is newly obtained in S25 while the rear detection value vRr is newly obtained in S26.

A difference Δv between a difference of the latest front detection value vFr and the front reference value KvFr, i.e., vFr−KvFr, and a difference of the latest rear detection value vRr and the rear reference value KvRr, i.e., vRr−KvRr, is calculated in S27. Because the electromagnetic clutch 53 is in the connected state so as to retain the sliding door 21 in the intermediate position, the strain generated in the front bracket 43*b* increases when the sliding door 21 is opened, thereby increasing the front detection value vFr. On the other hand, the strain generated in the rear bracket 44*b* increases when the sliding door 21 is closed, thereby increasing the rear detection value vRr. Accordingly, the difference Δv is made larger in positive number when the strain generated in the front bracket 43*b* is larger along with the opening operation of the sliding door 21. In addition, the difference Δv is made larger in negative number when the strain generated in the rear bracket 44*b* is larger along with the closing operation of the sliding door 21.

It is determined whether or not the difference Δv exceeds a predetermined value S3 (>0) in S28. When it is determined that the difference Δv exceeds the predetermined value S3 and thus the sliding door 21 is determined to be opened, the drive unit 36 starts to assist the opening operation of the sliding door 21 in S30. On the other hand, when it is determined that the difference Δv does not exceed the predetermined value S3, then it is determined whether or not the difference Δv is below a predetermined value S4 (<0) in S29. When it is determined that the difference Δv is below the predetermined value S4 and thus the sliding door 21 is determined to be closed, the drive unit 36 starts to assist the closing operation of the sliding door 21 in S31. Further, when it is determined that the difference Δv does not exceed the predetermined value S4 (i.e., difference Δv falls within a range from S3 to S4), the sliding door 21 is kept retained in the intermediate position in S32 because no force is added to the open direction or the close direction of the sliding door 21. The operation returns to S25 to repeat the same routine.

Accordingly, when the operating force is applied from the outside of the vehicle by a user or the like to any portion of the sliding door 21 for opening or closing the sliding door 21, the automatic open or close operation of the sliding door 21 is started and performed in response to the operating direction of the sliding door 21 based on the detection values vFr and vRr (difference Δv).

According to the aforementioned second embodiment, the following effects may be obtained in addition to those obtained according to the first embodiment.

(1) The strain gauges 51 and 52 are provided at the front bracket 43*b* and the rear bracket 44*b*, respectively, that hold the cable 37 (specifically, the other ends 43*a* and 44*a* of the wires 43 and 44) connecting the drive unit 36 and the sliding door 21 to each other. Thus, even when the sliding door 21 is stopped in any position between the fully closed position and the fully open position, the opening or closing operation of the sliding door 21 achieved by the application of force to the arbitrary portion of the sliding door 21 for opening or closing the sliding door 21 is detectable at the brackets 43*b* and 44*b*. Accordingly, the opening operation or the closing operation of the sliding door 21 is determined, i.e., it is determined which direction the sliding door 21 is operated, on the basis of the detection values of the strain gauges 51 and 52, thereby realizing the opening operation or the closing operation of the sliding door 21 by the drive unit 36. The automatic open or close operation of the sliding door 21 in response to the operating direction by the user can be started.

(2) According to the second embodiment, the strain gauges 51 and 52 are provided at the front bracket 43*b* and the rear bracket 44*b*, respectively. Thus, even when the tensile force is generated at only one end portion of the cable 37 depending on the operating direction of the sliding door 21, i.e., even when the strain is generated in only one of the front bracket 43*b* and the rear bracket 44*b*, both of the opening operation and the closing operation of the sliding door 21 are detectable.

(3) According to the second embodiment, which direction (open or close) the sliding door 21 is operated is precisely determined on the basis of the stabilized detection values of the strain gauges 51 and 52 obtained after filtered by the thresholds values (after the processes of S13 to S22).

(4) According to the second embodiment, the stabilized detection values of the strain gauges 51 and 52 obtained immediately after filtered by the thresholds values are used as the reference values (KvFr, KvRr). Then, the variations of the detection values of the strain gauges 51 and 52 after the reference values are specified relative to the reference values for the opening operation and the closing operation are calculated to thereby precisely determine which direction (open or close) the sliding door 21 is operated.

(5) According to the second embodiment, the variation of the detection value of the strain gauge 51 after the reference value is specified relative to the reference value (KvFr) for the open direction and the variation of the detection value of the strain gauge 52 after the reference value is specified relative to the reference value (KvRr) for the close direction are calculated, thereby precisely determining the opening operation or the closing operation.

The aforementioned embodiments may be modified or changed as follows. According to the first embodiment, the stabilized detection value of the strain gauge 10 after filtered by the threshold value may be used for determining the opening operation or the closing operation of the rear hatch 1.

According to the first embodiment, as long as the strain is detectable by the strain gauge 10 depending on the operating direction of the sliding door 21 when the sliding door 21 is opened or closed, the strain gauge 10 may be arranged at the other portion connecting the rear hatch 1 and the vehicle body 2 than the bracket 5. For example, the strain gauge 10 may be arranged at an appropriate member that receives a reaction force caused by the opening operation or the closing operation of the rear hatch 1, such as a connecting portion of the bracket 5 with the vehicle body 2, the drive unit 4, the arm member 8, and the rod 9.

According to the second embodiment, as long as the strains are detectable by the strain gauges 51 and 52 in response to the opening operation or the closing operation of the sliding door 21, the strain gauges 51 and 52 may be arranged at the other portion connecting the sliding door 21 and the side body 22 than the brackets 43*a* and 44*a*. For example, the strain gauges 51 and 52 may be arranged at an appropriate member that receives a reaction force caused by the opening operation or the closing operation of the sliding door 21, such as a connecting portion between the bracket 36*a* and the sliding door 21, the drive unit 36 (output drum 40), the pulley mechanism 38 guiding the wires 43 and 44 (guide pulleys 48 and 49), the guide roller unit 26 (base plate 29), the bracket 27.

Instead of the cable 37, a drive belt may be used according to the second embodiment. In addition, instead of the strain gauge, an appropriate load sensor may be used according to the first and second embodiments.

The opening and closing member includes a swing door, a trunk lid, and the like.

According to the aforementioned embodiments, the connecting portion is one of the bracket 5 for attaching the drive unit 4 to the vehicle body 2 or the bracket 36*a* for attaching the drive unit 36 to the door 21, the brackets 43*b* and 44*b* for holding the cable 37 transmitting a drive force, and the pulley mechanism 38.

According to the aforementioned second embodiment, the sensors are constituted by the strain gauges 51 and 52 provided at the front bracket 43*b* and the rear bracket 44*b*, respectively, that holds the cable 37 connecting the drive unit 36 with the sliding door 21.

According to the aforementioned second embodiment, the ECU 56 filters the detection values of the strain gauges 51 and 52 by the threshold values S1 and S2 and determines the opening operation or the closing operation of the sliding door 21 based on the filtered detection values.

According to the aforementioned second embodiment, the ECU 56 specifies the reference values KvFr and KvRr based on the detection values of the strain gauges 51 and 52 immediately after filtered by the threshold values S1 and S2, calculates variations of the detection values after the reference values KvFr and KvRr are specified relative to the reference values KvFr and KvRr for the opening operation and the closing operation of the sliding door 21 to determine the opening operation or the closing operation of the sliding door 21, and controls the drive unit 36 to drive the sliding door 21 to open or close the opening portion 22*a*.

According to the aforementioned second embodiment, a difference between the variations of the detection value of the strain gauge 51 detecting the opening operation after the reference value KvFr is specified relative to the reference value for KvFr the opening operation and the variations of the detection value of the strain gauge 52 detecting the closing operation after the reference value KvRr is specified relative to the reference value KvRr for the closing operation is calculated to determine the opening operation or the closing operation of the sliding door 21, and the drive unit 56 drives the sliding door 21 to open or close the opening portion 22*a*.

Because the two strain gauges 51 and 52 are provided, both of the opening operation and the closing operation of the sliding door 21 are detectable. Then, the opening operation or the closing operation of the sliding door 21, i.e., which direction the sliding door 21 is operated, is more precisely determined by the calculation of the difference between variations of the detection value of the strain gauge 51 detecting the opening operation after the reference value KvFr is specified relative to the reference value KvFr for the opening operation and variations of the detection value of the strain gauge 52 detecting the closing operation after the reference value KvRr is specified relative to the reference value KvRr for the closing operation.

According to the aforementioned embodiments, regardless of a stop position of the door 1 or 21, i.e., wherever the door 1 or 21 is stopped, the opening operation or the closing operation thereof by the application of force to the arbitrary portion of the opening and closing member is detectable. The auto open or close operation of the door 1 or 21 can be started in response to the operating direction of the door 1 or 21.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opening and closing member control apparatus for a vehicle, comprising:

- a bracket which is deformable and which is attached to either the vehicle body or the opening and closing member;
- driving means mounted on the bracket and adapted to drive an opening and closing member to open and close an opening portion formed at a vehicle body;
- a strain gauge sensor provided on the bracket, the strain gauge sensor detecting different deformations of the bracket and recognizing that the different deformations of the bracket are indicative of opening and closing operations of the opening and closing member; and
- drive controlling means controlling the driving means to drive the opening and closing member to open or close the opening portion by determining the opening operation or the closing operation of the opening and closing member based on a detection value of the strain gauge sensor.

2. An opening and closing member control apparatus according to claim 1 wherein the sensor is constituted by strain gauges provided at a front bracket and a rear bracket respectively holding the drive force transmission member connecting the driving means with the opening and closing member.

3. An opening and closing member control apparatus according to claim 1, wherein the drive controlling means filter the detection value of the sensor by a threshold value and determine the opening operation or the closing operation of the opening and closing member based on the filtered detection value.

4. An opening and closing member control apparatus according to claim 1, wherein the drive controlling means filter the detection value of the sensor by a threshold value and determine the opening operation or the closing operation of the opening and closing member based on the filtered detection value.

5. An opening and closing member control apparatus according to claim 2, wherein the drive controlling means filter the detection value of the sensor by a threshold value and determine the opening operation or the closing operation of the opening and closing member based on the filtered detection value.

6. An opening and closing member control apparatus according to claim 1, wherein the drive controlling means specify a reference value based on the detection value of the sensor immediately after filtered by a threshold value, calculate variations of the detection value after the reference value is specified relative to the reference value for each of the opening operation and the closing operation of the opening and closing member to determine the opening operation or the closing operation of the opening and closing member, and control the driving means to drive the opening and closing member to open or close the opening portion.

7. An opening and closing member control apparatus according to claim 1, wherein the drive controlling means specify a reference value based on the detection value of the sensor immediately after filtered by a threshold value, calculate variations of the detection value after the reference value is specified relative to the reference value for each of the opening operation and the closing operation of the opening and closing member to determine the opening operation or the closing operation of the opening and closing member, and control the driving means to drive the opening and closing member to open or close the opening portion.

8. An opening and closing member control apparatus according to claim 2, wherein the drive controlling means specify a reference value based on the detection value of the sensor immediately after filtered by a threshold value, calculate variations of the detection value after the reference value is specified relative to the reference value for each of the opening operation and the closing operation of the opening and closing member to determine the opening operation or the closing operation of the opening and closing member, and control the driving means to drive the opening and closing member to open or close the opening portion.

9. An opening and closing member control apparatus according to claim 3, wherein the drive controlling means specify a reference value based on the detection value of the sensor immediately after filtered by a threshold value, calculate variations of the detection value after the reference value is specified relative to the reference value for each of the opening operation and the closing operation of the opening and closing member to determine the opening operation or the closing operation of the opening and closing member, and control the driving means to drive the opening and closing member to open or close the opening portion.

10. An opening and closing member control apparatus according to claim 4, wherein the drive controlling means specify a reference value based on the detection value of the sensor immediately after filtered by a threshold value, calculate variations of the detection value after the reference value is specified relative to the reference value for each of the opening operation and the closing operation of the opening and closing member to determine the opening operation or the closing operation of the opening and closing member, and control the driving means to drive the opening and closing member to open or close the opening portion.

11. An opening and closing member control apparatus according to claim 5, wherein the drive controlling means specify a reference value based on the detection value of the sensor immediately after filtered by a threshold value, calculate variations of the detection value after the reference value is specified relative to the reference value for each of the opening operation and the closing operation of the opening and closing member to determine the opening operation or the closing operation of the opening and closing member, and control the driving means to drive the opening and closing member to open or close the opening portion.

12. An opening and closing member control apparatus according to claim 6, wherein a difference between the variations of the detection value of one of the sensors detecting the opening operation after the reference value is specified relative to the reference value for the opening operation and the variations of the detection value of the other one of the sensors detecting the closing operation after the reference value is specified relative to the reference value for the closing operation is calculated to determine the opening operation or the closing operation of the opening and closing member, and the driving means drive the opening and closing member to open or close the opening portion.

13. An opening and closing member control unit according to claim 7, wherein a difference between the variations of the detection value of one of the sensors detecting the opening operation after the reference value is specified relative to the reference value for the opening operation and the variations of the detection value of the other one of the sensors detecting the closing operation after the reference value is specified relative to the reference value for the closing operation is calculated to determine the opening operation or the closing operation of the opening and closing member, and the driving means drive the opening and closing member to open or close the opening portion.

14. An opening and closing member control unit according to claim 8, wherein a difference between the variations of the detection value of one of the sensors detecting the opening operation after the reference value is specified relative to the reference value for the opening operation and the variations of the detection value of the other one of the sensors detecting the closing operation after the reference value is specified relative to the reference value for the closing operation is calculated to determine the opening operation or the closing operation of the opening and closing member, and the driving means drive the opening and closing member to open or close the opening portion.

15. An opening and closing member control unit according to claim 9, wherein a difference between the variations of the detection value of one of the sensors detecting the opening operation after the reference value is specified relative to the reference value for the opening operation and the variations of the detection value of the other one of the sensors detecting the closing operation after the reference value is specified relative to the reference value for the closing operation is calculated to determine the opening operation or the closing operation of the opening and closing member, and the driving means drive the opening and closing member to open or close the opening portion.

16. An opening and closing member control unit according to claim 10, wherein a difference between the variations of the detection value of one of the sensors detecting the opening operation after the reference value is specified relative to the reference value for the opening operation and the variations of the detection value of the other one of the sensors detecting the closing operation after the reference value is specified relative to the reference value for the closing operation is calculated to determine the opening operation or the closing operation of the opening and closing member, and the driving means drive the opening and closing member to open or close the opening portion.

17. An opening and closing member control unit according to claim 11, wherein a difference between the variations of the detection value of one of the sensors detecting the opening operation after the reference value is specified relative to the reference value for the opening operation and the variations of the detection value of the other one of the sensors detecting the closing operation after the reference value is specified relative to the reference value for the closing operation is calculated to determine the opening operation or the closing operation of the opening and closing member, and the driving means drive the opening and closing member to open or close the opening portion.

18. An opening and closing member control apparatus according to claim 1, wherein the bracket is made from a single metal sheet and includes a first portion connected to the vehicle body, a second portion on which the strain gauge sensor is provided, and a third portion mounting thereon the driving means, the second portion being positioned between the first portion and the third portion, the second portion being configured as a step portion relative to each of the first portion and the third portion.

19. An opening and closing member control apparatus according to claim 18, wherein the third portion of the bracket terminates as a free distal end of the bracket.

20. An opening and closing member control apparatus according to claim 18, wherein the first and the third portions of the bracket extend in opposite directions relative to the second portion and are positioned at right angles to the second portion.

* * * * *